Jan. 20, 1959    C. S. R. MARSHALL    2,869,697
POWER TRANSMISSION CLUTCH
Filed Aug. 15, 1955
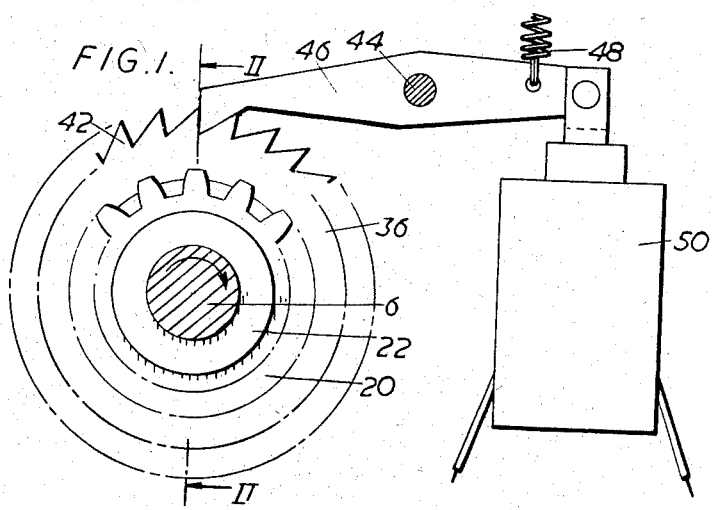
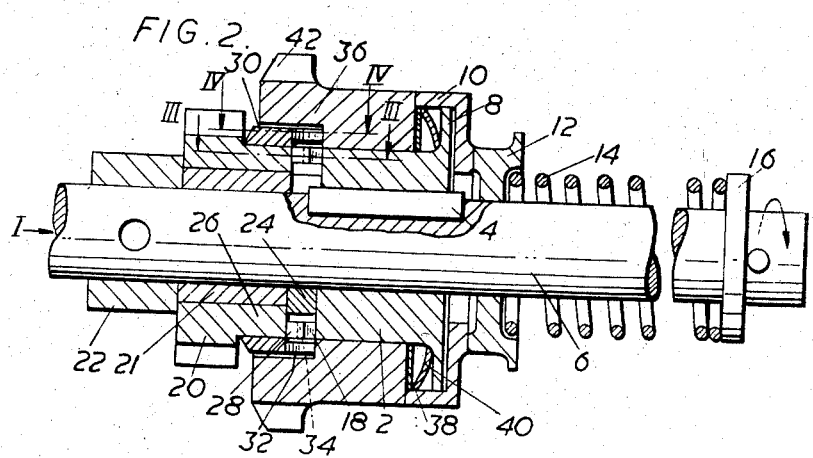
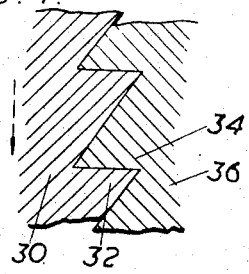
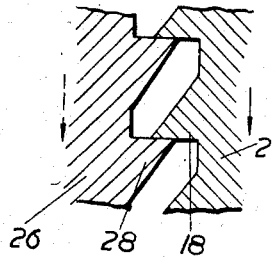
Inventor
Colin S. R. Marshall
By
Holcombe Wetherill & Brisebois
Attorneys

United States Patent Office 2,869,697
Patented Jan. 20, 1959

2,869,697

POWER TRANSMISSION CLUTCH

Colin S. R. Marshall, Salfords, England, assignor to Tiltman Langley Limited, Redhill Aerodrome, England Application August 15, 1955, Serial No. 528,300

Claims priority, application Great Britain August 18, 1954

4 Claims. (Cl. 192—17)

This invention relates to power transmission clutches and particularly to clutches which are required to drive positively in one direction only, and may be required to engage and disengage frequently.

The invention provides a simple and inexpensive positive one-way clutch, and is particularly suitable for use in instruments where power has to be transmitted intermittently and where the minimum of lost motion and delay in operation is necessary.

According to the invention, power is transmitted from a driving to a driven member mounted to rotate on the same axis as the driving member, by means of corresponding sets of driving dogs or teeth formed on the opposed faces of the driving and driven members one of which is slidable axially and is urged into engagement with the other member by means of a spring, and to disengage the clutch, corresponding cam surfaces in the form of ratchet teeth are provided on the driven member and a control member rotatable on the driving member co-axial with the driving teeth or dogs, the height of the cam profile being greater than the height of the driving teeth or dogs, such that on arresting the control member, the cam surfaces force the driving and driven members axially apart, thus interrupting the drive. The rotation of the driven member immediately ceases so that the whole mechanism thereafter remains stationary, with the exception of the driving member, until the control member is released.

Preferably, the control member is arrested by a detent engaging in one of a series of teeth formed on the outside of the control member.

The accompanying drawings show an example of a clutch according to the present invention. In these drawings:

Figure 1 is an end view looking in the direction of the arrow 1 in Figure 2;

Figure 2 is a central longitudinal section on the line II—II in Figure 1; and

Figures 3 and 4 are fragmentary sections on the lines III—III and IV—IV in Figure 2, on a larger scale.

In the clutch shown in the drawings the driving member is a hub 2 slidably keyed at 4 to a shaft 6 driven in any suitable way. The hub has a flange 8 upon which a cup 10 is free to slide axially. A sliding collar 12 on the shaft bears against this cup under the action of a helical coil spring 14, the other end of which abuts against a collar 16 which is fixed to the shaft. The opposite face of the driving member has a ring of axially projecting ratchet teeth 18.

The driven member is a spur wheel or pinion 20 with a liner 21 freely rotatable on the shaft 6 and prevented from sliding away from the driving member 2 by a collar 22 fixed to the shaft, a washer 24 being provided on the shaft between the driving and driven members. The driven member has a hub 26 on the face adjacent to the driving member, and on the face of this hub axially projecting ratchet teeth 28 are formed to engage with the corresponding ratchet teeth on the driving member. The teeth 18 and 28 together act as driving teeth.

A ring 30 is a driving fit over the outside of the hub 26 of the driven member and has axially projecting ratchet teeth 32, the height of which is greater than the height of the driving teeth, and which co-operate with a similar set of teeth 34 on a control wheel 36 which is freely rotatable on the outer surface of the driving member 2. The teeth 32 and 34 act as cam surfaces.

The opposite face of the control wheel engages against the rim of the cup 10. Between this control wheel and the flange of the driving member a thrust washer 38 and a resilient cup washer 40 are provided. The control wheel also has a series of external teeth 42 at the end nearest the driven member. On a shaft 44 parallel to the main shaft 6, a pawl 46 is pivoted having a nose capable of engaging with these teeth 42. The other end of the pawl is connected to a spring 48 urging the nose of the pawl into engagement, and is also connected to a solenoid 50 which holds the pawl out of engagement against the action of the spring when it is excited. In this condition, both sets of ratchet teeth 18, 28 and 32, 34 engage, and the driven member 20 is driven positively from the driving member 2. When excitation of the solenoid ceases, the spring 48 urges the pawl 46 into engagement with the control wheel 36, thus stopping the control wheel, so that the continued rotation of the driven member 20 and the ring 30 mounted thereon urges the control wheel 36 axially away from the driven member, while those of the teeth 42 which are in engagement with the pawl 46 slide transversely across the tip thereof. The control wheel slides axially on the driving member 2, and compresses the resilient cup washer 40 until the thrust transmitted through the washer to the flange 8 of the driving member is sufficient to move the driving member to disengage the driving ratchet 18, 28. The axial movement of the control wheel causes a corresponding axial movement of the cup 10 against the action of the spring 14, thus relieving the driving member of the force of the spring. While the pawl remains engaged, the driving member rotates freely inside the control wheel. As soon as the solenoid is once more energized, the pawl 46 is withdrawn, leaving the control wheel free to return to the engaged position under the action of the spring 14 on the cup 10 and also free to rotate. The ratchet teeth 18, 28 therefore engage once more and the drive is restored.

The resilience of the cup washer 40 ensures that the movement of the driving member lags behind the control wheel, so that when the teeth 18 of the former do disengage, they are carried well clear of the corresponding teeth 28 of the driven member. The teeth 18, 20 will then remain clear of one another, being held apart by the engagement of the teeth 32, 34 provided the driven member does not then move backwards, until the pawl 46 is withdrawn from the ratchet teeth 42. In many circumstances there will be sufficient friction in the mechanism to which the driven member is connected to prevent backward rotation of the driven member 20, but if there is not, some form of anti-reversing mechanism or braking device may be provided for this purpose. Such devices are well known.

Since, in effect, the engagement of the pawl causes the clutch to drive itself free, the clutch will disengage without difficulty even under high torque loadings, and the maximum torque is set only by the strength of the clutch components. The engagement and disengagement are independent of the speed and are almost instantaneous upon engagement of the pawl. The clutch will continue to operate even when the components become quite badly worn, so that a long working life is obtained before replacements become necessary. Moreover, as wear on the engaging parts only takes place during engagement and disengagement, and not while the clutch is driven or idling, the clutch can be very simply lubricated, for instance by an oil bath, and the operating temperature of the clutch is not at all critical. Since the engagement is positive, it may be necessary to provide torsional resilience in the drive to absorb the shock. For high speeds and large sizes, the peripheral speed of the control wheel may become so high that the sudden engagement of the pawl may be undesirable, so that some alternative arrangement for arresting the control wheel, such as a band brake, may be provided.

I claim:

1. A clutch comprising a driving member, a driven member and a control member, said three members being independently rotatable about a common axis, said control member being movable axially relatively to said driven member, and said driving member being movable axially relatively to said control member, cooperating axially-facing cam surfaces on said driven member and said control member, first spring means urging said cam surfaces into interengagement, means for arresting rotation of said control member, cooperating driving teeth on said driving member and driven member, stop means limiting axial movement of said driving member relatively to said control member in the direction to cause disengagement of said driving teeth, second spring means urging said driving member relatively to said control member towards said stop means, and means imposing resistance to rotation of said driven member in at least one direction, whereby, upon rotation of said driving member opposite to said one direction and upon application of said arresting means to said control member, said cam surfaces will move said control member axially, said second spring means will carry said driving teeth clear out of interengagement, and said driven member will cease rotation until release of said arresting means, whereupon said first spring means will return said driving teeth into interengagement.

2. A clutch according to claim 1 wherein said means imposing resistance to rotation is adapted to impose positive resistance to rotation of said driven member in said one direction.

3. A quick disengaging clutch for transmitting power intermittently from a driving member to a driven member mounted to rotate on concentric axes, said clutch comprising a driving element mounted to slide co-axially on the same axis as the driving member and rotatable therewith, said driving element rotating said driven member by means of corresponding sets of driving teeth formed on opposed faces of the driving element and driven member respectively, a spring pressing said driving element and driven member together in the axial direction and permitting separation thereof to disengage said sets of teeth and thereby to disengage the clutch, a control member rotatably and slidably mounted on the same axis as said driven member, corresponding cam surfaces in the form of cooperating axial pressure members on the driven member and on the control member providing axial locating means interengaged in all positions of said clutch, the effective height of the cam profile thereof being greater than the effective height of the driving teeth, whereby on stopping rotation of the control member, said cam surfaces force axially and hold apart the driving element and driven member thus permitting continuous rotation of the former free from contact with the latter so long as said control member remains stationary.

4. A clutch according to claim 3 in which axial force is transmitted from the control member to the driving element through a resilient member positioned to exert axial pressure tending to separate said element from said driven member of less force than that of the spring which presses said driving element and driven member together, whereby on disengagement of said driving element and driven member the driving teeth thereon are carried clear of one another and are held out of engagement by said resilient member.

References Cited in the file of this patent

UNITED STATES PATENTS 1,472,815     Schimek _____ Nov. 6, 1923

FOREIGN PATENTS 317,159     Great Britain _____ Aug. 15, 1929